United States Patent Office 3,440,568
Patented Apr. 22, 1969

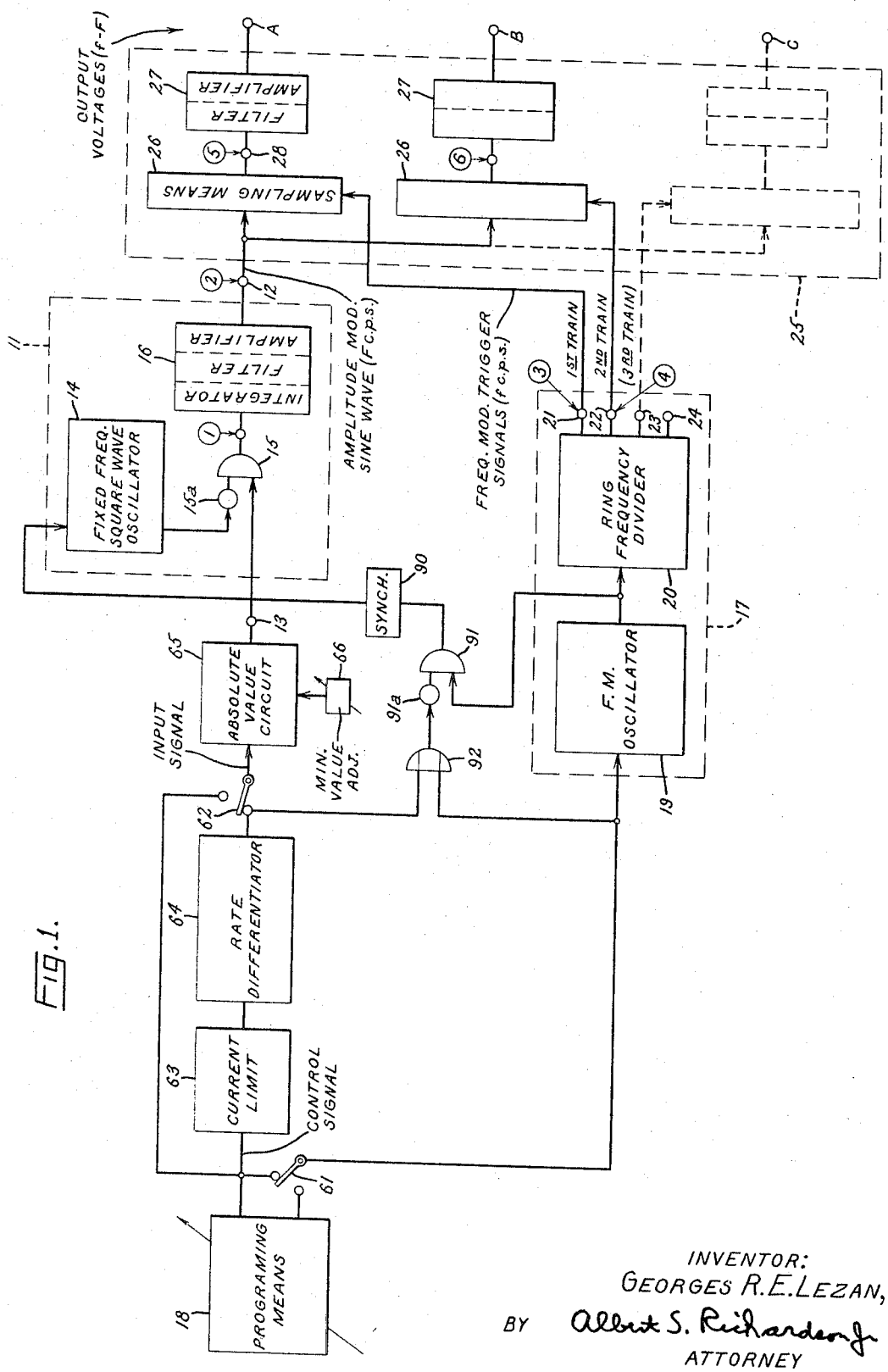

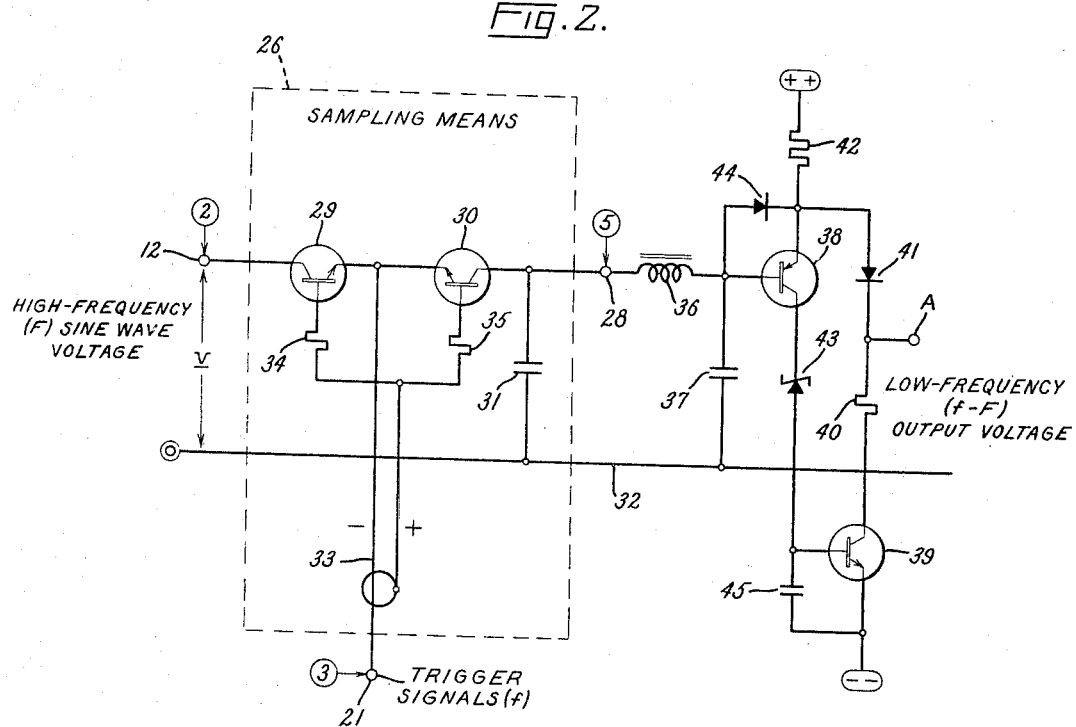
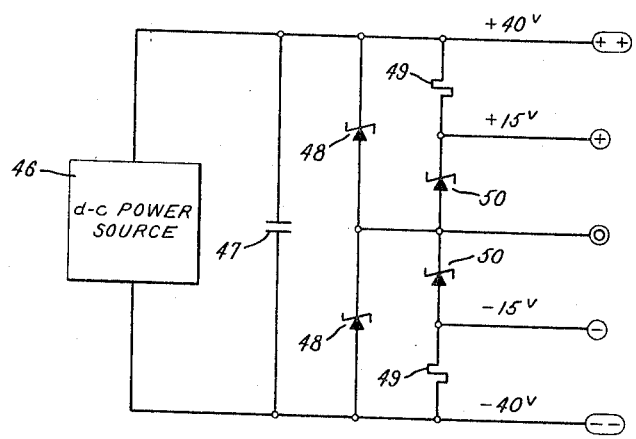

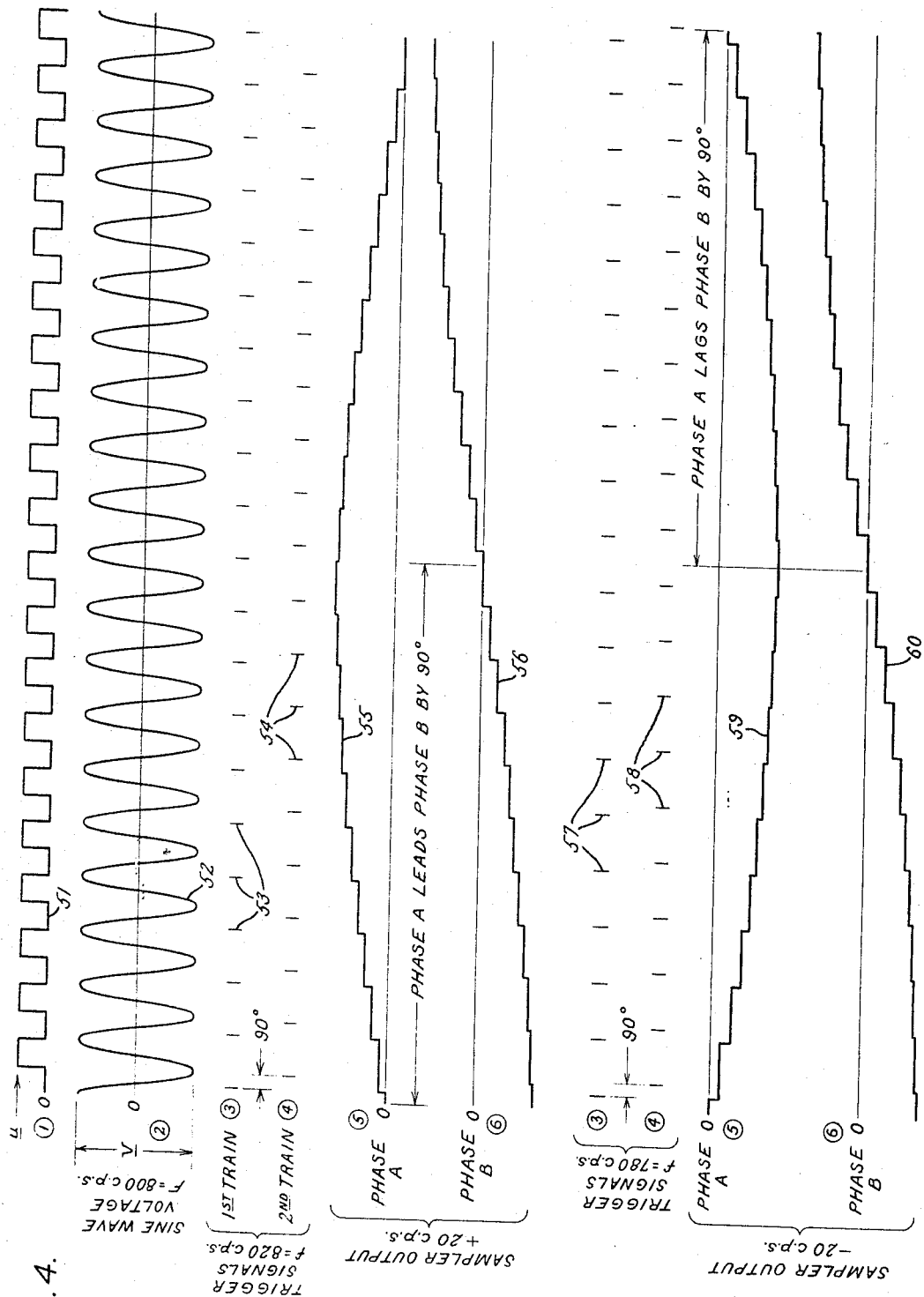

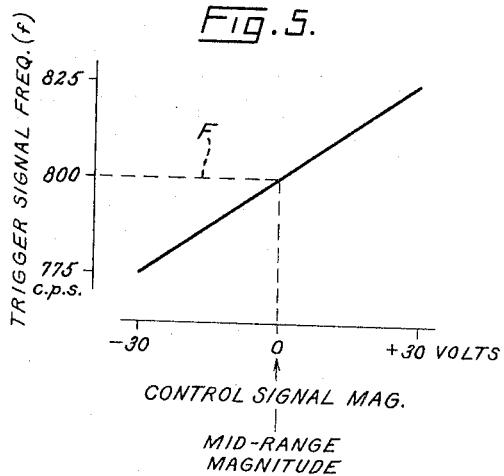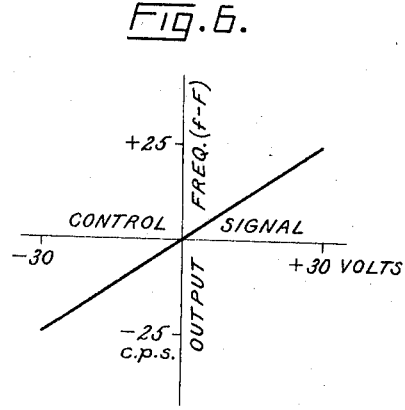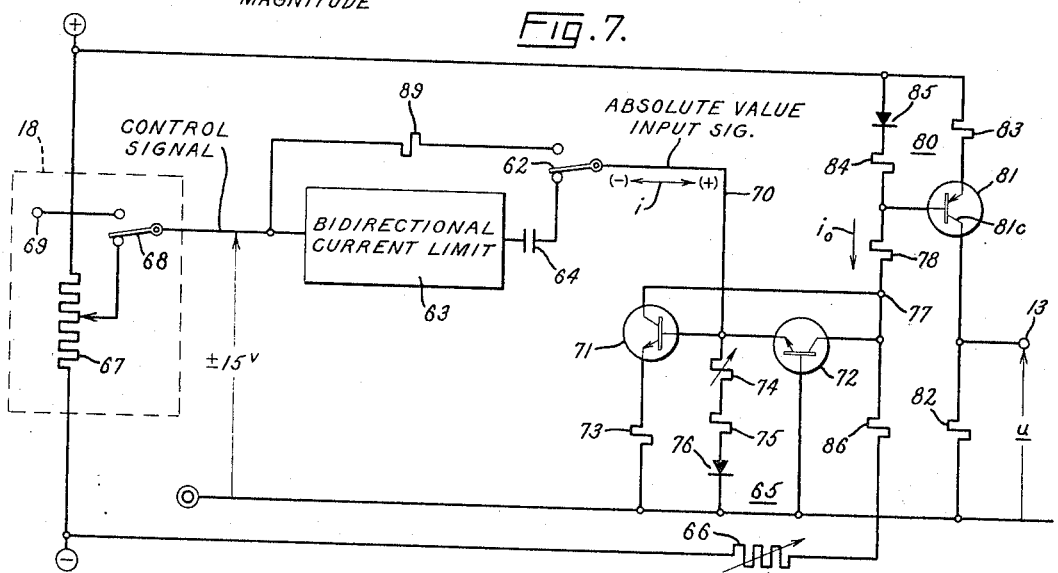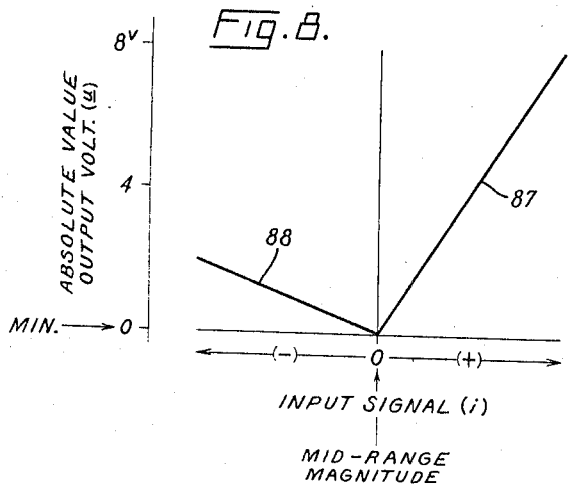

3,440,568
GENERATOR FOR AMPLITUDE AND FREQUENCY MODULATED LOW-FREQUENCY ALTERNATING VOLTAGES
Georges R. E. Lezan, Cherry Hill, N.J., assignor to General Electric Company, a corporation of New York
Filed May 31, 1966, Ser. No. 553,922
Int. Cl. H03c 3/00, 1/00, 5/00
U.S. Cl. 332—17                    22 Claims This invention relates to variable low-frequency alternating voltage generators, and, more particularly, it relates to static circuit means for generating amplitude and frequency modulated polyphase alternating voltages of reversible phase sequence.

A general objective of the invention is to provide improved means for generating polyphase alternating voltages that are characterized by variable magnitude (e.g., zero to 25 volts peak), variable low frequency (e.g., zero to 25 cycles per second), and reversible phase sequence (e.g., A–B–C or C–B–A), wherein the voltage magnitude on the one hand and the frequency and phase sequence on the other can be separately or jointly varied as desired. Such means is particularly useful for purposes of controlling an A-C reversing motor of a motor-driven process according to a predetermined program of changing loads, speeds, and direction.

Another object of my invention is the provision of means for generating a variable frequency alternating voltage whose magnitude can be made proportional to the rate-of-change of frequency. Such means is useful for purposes of controlling an adjustable speed A-C motor that requires more torque for acceleration or deceleration than when running at a steady speed.

Yet another object of the invention is the provision, for generating an alternating voltage whose amplitude and frequency are both modulated by a bipolar D-C control signal of variable magnitude, of versatile means characterized by very sensitive, rapid, yet smooth and accurate transient response to control signal variations. Furthermore, such means should also be capable of producing variable low-frequency polyphase voltages that will accurately conform to a desired waveform (e.g., a sine wave).

My invention utilizes the so-called "sampling technique" for generating relatively low-frequency waveforms. According to this known technique, a low-frequency replica of a high-frequency carrier of any desired waveform is obtained by using means for momentarily sampling and then holding the magnitude of the carrier at regularly recurring intervals whose frequency differs from the carrier frequency. The sample-and-hold means therefore generates a reduced-frequency stepped approximation of the carrier that can be readily filtered to produce a high quality output of the desired waveform. It is a further object of the present invention to provide an improved variable low-frequency alternating voltage generator utilizing such a technique.

In carrying out my invention in one form, I provide first, second, and third means to be described. The first means is operative to generate an amplitude-modulated sinusoidal voltage having a relatively high fixed frequency F, and modulating means is provided for varying its amplitude in accordance with the absolute value of a variable magnitude bipolar input quantity that is applied thereto. The second means produces a plurality of phased-displaced trains of intermittent trigger signals having a variable frequency $f$ which is programed to vary between limits respectively lower and higher than F. The sinusoidal voltage and the plurality of trigger signal trains are all fed to the third means which includes a corresponding plurality of duplicate sampling means from which a plurality of low-frequency out-of-phase alternating voltages are respectively derived. Each of the sampling means operates periodically to adjust the value of the alternating voltage that is derived therefrom to reflect the instantaneous magnitude and polarity of the high-frequency sinusoidal voltage on the incidence of successive trigger signals in a corresponding one of said trains. As a result, the derived voltages approximate sine waves and are characterized by a common amplitude that depends on the amplitude of the high-frequency sinusoidal voltage and a common frequency that is equal to the difference between F and $f$. Furthermore, the derived voltages, which at all frequencies are displaced in phase with respect to each other by electrical angles corresponding to the phase displacements between the respective trains of trigger signals, will have a certain phasor sequence whenever $f$ is higher than F and just the opposite sequence when $f$ is lower than F.

In one aspect of my invention, the aforesaid amplitude modulating means is arranged to effect a first magnitude relationship between its input quantity and the sinusoidal voltage amplitude whenever the input quantity has a certain relative polarity and to effect a different magnitude relationship therebetween when the input quantity has the opposite polarity. A predetermined minimum amplitude is obtained when the input quantity is zero. In another aspect of the invention, means is provided for varying said input quantity in accordance with the rate-of-change of a control signal that is variable over a given range of magnitudes. If desired, this control signal can also be used to program the variable frequency $f$, with $f=F$ at a predetermined mid-range magnitude of the control signal.

My invention will be better understood and its various objects and advantages will be more fully appreciated from the following description taken in conjunction with the accompanying drawings in which:

FIG. 1 is a functional block diagram of a complete system embodying the invention in its preferred form;

FIG. 2 is a schematic circuit diagram of a sampling means, filter, and amplifier shown in block form in FIG. 1;

FIG. 3 is a schematic circuit diagram of a D-C power supply useful in conjunction with various circuits of the illustrated system;

FIG. 4 is a chart showing typical magnitudes of certain quantities of the system with respect to time;

FIGS. 5 and 6 are graphs of certain frequency vs. control signal characteristics of this system;

FIG. 7 is a schematic diagram of the absolute value circuit and associated circuitry shown in block form in FIG. 1; and FIG. 8 is a graph of a typical output vs. input characteristic of the absolute value circuit shown in FIG. 7.

Referring now to FIG. 1, a system is shown for generating a plurality of low-frequency alternating voltages of variable amplitude, frequency, and phase sequence. In a 2-phase system, two such voltages are generated, appearing respectively at the system output terminals A and B. Where a 3-phase arrangement is desired, a phase C voltage will be generated at an additional output terminal C of the system.

The system includes means 11 for generating at its output terminal 12 a single-phase amplitude-modulated cyclic voltage of relatively high, substantially fixed frequency F, which may, for example, be 800 c.p.s. The generator 11 can be designed to provide a cyclic voltage of any desired waveform, and for convenience this voltage will be assumed hereinafter to be sinusoidal. The variable peak-to-peak amplitude of the high-frequency sinusoidal voltage will be referred to hereinafter as $v$, which quantity is linearly proportional to the variable magnitude ($u$) of a modulating signal energizing an input terminal 13 of the sine wave generator 11.

The circuit particulars of the high-frequency sine wave generating means 11 are not critical to the practice of my invention. For purposes of illustration, however, this component has been shown as comprising a fixed-frequency square wave oscillator 14, and AND logic element 15, and a wave-shaping and amplifying element 16. The oscillator 14 supplies a succession of square wave gating pulses at the fixed frequency F to a "not" input 15a of the AND element 15. The other input of the AND element 15 is connected to the terminal 13 for energization by the modulating signal. Consequently the output of element 15, as seen at point 1, will be a square wave voltage whose frequency is F and whose magnitude is equal to that of the modulating signal. This voltage is integrated, filtered, and amplified by element 16, whereby the previously mentioned amplitude-modulated sine wave of high fixed frequency F is provided at the output terminal 12.

The system shown in FIG. 1 also includes means 17 for producing at least first and second trains of intermittent trigger signals or pulses which recur, in each train, at a variable frequency $f$. The means 17 is so constructed and arranged that the trigger signal frequency $f$ is variable, between limits that are respectively lower than and higher than F, as a function of a variable control signal supplied by suitable programing means 18. The various trigger signal trains are displaced in phase with respect to each other so that their respective signals are staggered. For example, in a 2-phase system the trigger signals in the second train lag those in the first train by 90 electrical degrees ($1/4f$), whereas in a 3-phase system there is 120 degrees ($1/3f$) displacement between the trigger signals of the first, second, and third trains, respectively.

Again the circuit particulars of the trigger signal producing means 17 are not critical to the practice of my invention. For purposes of illustration, this component of the system is shown as comprising a frequency-modulated oscillator 19 and a ring frequency divider 20. The oscillator 19 operates at a variable frequency that is programed by the control signal applied thereto to supply a relatively high-frequency succession of pulses to the ring frequency divider 20. For a 2-phase system, the frequency divider 20 is designed to respond to a sequence of four pulses from the oscillator 19 by applying output pulses in succession to four output terminals 21, 22, 23, and 24. In a 3-phase system, the frequency divider 20 would be arranged to respond to a sequence of three consecutive pulses from the oscillator 19 by producing output pulses in succession at three output terminals 21, 22, and 23. The output pulses at terminal 21 comprise the trigger signals of the first train, the output pulses at terminal 22 comprise the trigger signals in the second train, and, where used, the output pulses at the third terminal 23 comprise the trigger signals in the third train.

As can be seen in FIG. 1, a third main component of the system comprises for respectively supplying to the system output terminals A and B (and C, if used) a plurality of out-of-phase alternating voltages. For each phase the alternating-voltage supplying means 25 includes periodically operative sampling means 26 and an element 27 for filtering and amplifying the output of that sampling means. The various sampling means 26 are all connected to the output terminal 12 of the high-frequency sine wave generator 11, and each is controlled by a different one of the trains of frequency-modulated trigger signals produced by component 17.

The function of each sampling means 26 is to provide at its output terminal 28 a voltage that is a low-frequency stepped approximation of the amplitude-modulated sine wave generated at terminal 12. It does this by momentarily sampling the value of the sine wave when triggered by a trigger signal in the associated train and then holding or storing this value until the next succeeding trigger signal occurs. The frequency of the resulting voltage will equal the difference between the fixed frequency F of the sine wave and the variable frequency $f$ of the trigger signals. One circuit well suited for practicing this sampling technique is shown in FIG. 2, which figure also illustrates how the associated filter and amplifier element 27 can be constructed.

As can be seen in FIG. 2, the sampling means 26 comprises a pair of NPN transistors 29 and 30 and a capacitor 31. The emitter-collector circuits of the transistors 29 and 30 are connected in inverse series relationship between the output terminal 12 of the sine wave generator and the output terminal 28 of the sampling means, while the capacitor is connected between the latter terminal and a common supply power bus 32 which is shown connected to a zero-potential reference terminal identified by an encircled zero. The transistors 29 and 30 form a bidirectional switch that is normally off (non-conducting) but can be turned on by a trigger signal conveyed thereto, via a coaxial conductor 33, from the output terminal 21 of the trigger signal producing means. Actually the terminal 21 represents an output winding of a pulse transformer in the trigger signal producing means, and the coaxial conductor 33 is terminated in the sampling means between the junction of the transistor emitters and the junction of their respective base resistors 34 and 35 as shown. Each trigger signal has sufficient magnitude so that on the incidence thereof current can freely flow in either direction between the capacitor 31 and the sine wave generator terminal 12. Thus at the moment each trigger signal is received by the sampling means, the capacitor 31 is in effect connected directly to the terminal 12 and quickly charges or discharges as necessary to incrementally change the value of its voltage to equal that of the sine wave at the sampling instant. The transistors 29 and 30 immediately revert to their normally off state and the capacitor 31 then holds its voltage substantially constant until the next sampling instant. Thus there is developed between the output terminal 28 of the sampling means 26 and the common bus 32 a low-frequency alternating voltage that approximates a sine wave and that is characterized by a frequency equal to the difference between F and $f$ and an amplitude substantially the same as the amplitude $v$ of the high-frequency sine wave at terminal 12.

The low-frequency output voltage of the sampling means 26 can be filtered by an LC filter 36, 37 to produce a high-quality sine wave, an amplified replica of which is applied to the phase A output terminal of the system. The final amplifying is done by a 2-stage emitter follower power amplifier comprising, as is shown in FIG. 2, a PNP transistor 38 and an NPN transistor 39. These transistors are connected between relatively positive and negative terminals of a suitable D-C power supply to be described in the following paragraph. The emitter of the transistor 39 is connected directly to the relatively negative supply power terminal (identified by the encircled pair of minus symbols), and its collector is connected to the relatively positive supply power terminal (identified by the encircled pair of plus symbols) by way of a circuit including, in series, a current limiting resistor 40, a compensating diode 41, and a load resistor 42. The output terminal A is connected to the junction of the resistor 40 and the diode 41. The emitter of the transistor 38 is connected to the junction of the diode 41 and to the resistor 42, and the collector of this transistor is connected by way of a breakdown diode 43 to the base electrode of the transistor 39. A diode 44 is connected from the base electrode to the emitter of the transistor 38, and a stabilizing capacitor 45 is connected between the base electrode and the emitter of the transistor 39. The operation of the amplifier 38 and 39 produces between terminal A and the common bus 32 a sinusoidal output voltage having an amplitude dependent on $v$ and a frequency equal to the difference between F and $f$.

A typical D-C power supply that can advantageously be used in conjunction with the circuits shown in FIG. 2

(and those shown in FIG. 7 which will be described hereinafter) is illustrated in FIG. 3. It is there seen to comprise any suitable source 46 of D-C power, a smoothing capacitor 47 connected across the source 46, and a pair of duplicate voltage regulators 48 connected in series across the smoothing capacitor. The junction of the regulators 48 comprises the zero-potential reference terminal of the power supply, and these devices are selected respectively to maintain at the relatively positive and negative terminals of the power supply substantially constant voltages of +40 volts and −40 volts with respect to the reference terminal. In order to obtain supply voltages of smaller magnitude (e.g., + and −15 volts), a dropping resistor 49 in series with another voltage regulator 50 is connected across each of the regulators 48 as shown, and the junctions of these elements 49 and 50 comprise positive and negative D-C supply power terminals identified by the encircled plus and minus symbols, respectively.

Returning to FIG. 1, the operation of system components 11, 17, and 25 will now be summarized. For this purpose it will be convenient to refer also to FIG. 4 which illustrates typical voltage vs. time characteristics of the system during twenty cycles of operation of the high-frequency sine wave generator 11 (F=800 c.p.s.). A 2-phase system will first be assumed.

The uppermost trace 51 in FIG. 4 represents the square wave voltage output of the AND element 15 at point 1 in the generator 11, and the magnitude of this voltage, measured with respect to the zero-potential reference terminal of the D-C power supply, is determined by the magnitude $u$ of the variable modulating signal that energizes the input terminal 13. The resulting fixed-frequency amplitude-modulated sine wave at terminal 12 (point 2 in FIGS. 1 and 2) is shown by the second trace 52 in FIG. 4, and its amplitude $v$ will be proportional to $u$. This is the voltage input to both sampling means 26 located in the component 25.

Each of the sampling means 26 is controlled by a corresponding train of the frequency-modulated trigger signals produced by the system component 17. In FIG. 4 the signals of the first train (point 3 in FIGS. 1 and 2) are depicted by the intermittent marks 53, and the signals of the second train (point 4 in FIG. 1) are depicted by the intermittent marks 54. It has been assumed that the programing means for the component 17 is now calling for a signal frequency $f$ of 820 c.p.s. Thus FIG. 4 shows trigger signals 53 and 54 for 20½ cycles of operation of component 17. The second signal train is seen lagging the first signal train by a quarter cycle or 90 electrical degrees, and this same relative phase displacement would be realized for any value of $f$.

The sampling means controlled by the first signal train supplies to its output terminal 28 (point 5 in FIGS. 1 and 2) an alternating voltage represented in FIG. 4 by the trace 55. (Only the positive half-cycle of this voltage appears in the time span covered by FIG. 4.) It will be apparent that the value of the voltage 55 is progressively adjusted by the involved sampling means to correspond to that of the sine wave 52 on the incidence of successive trigger signals 53 in the first train. The stepped voltage 55, on which the filtered and amplified phase A output voltage of the system depends, is characterized by a fundamental frequency of +20 c.p.s. ($f-F$), a waveform that approximates a sine wave, and an amplitude equal to $v$.

The companion sampling means controlled by the second signal train supplies to its output terminal (point 6 in FIG. 1) an alternating voltage that is represented in FIG. 4 by the trace 56, and this sampling means periodically adjusts the value of the voltage 56 to correspond to that of the sine wave 52 on the incidence of successive trigger signals 54 in the second train. The stepped voltage 56, on which the filtered and amplified phase B output voltage of the system depends, is a duplicate of the voltage 55 but lags it by a quarter of the low-frequency cycle (i.e., an electrical angle of 90 degrees). Thus the phase sequence of the output voltage is A–B.

FIG. 4 also illustrates the effect on the output voltages of changing the trigger signal frequency $f$ to 780 c.p.s. The trigger signals of the first train are now depicted by the intermittent marks 57, and those of the 90-degree phase-displaced second train are depicted by the intermittent marks 58. Only 19½ cycles of operation of the trigger-signal producing component 17 are illustrated at this low frequency. The resulting output voltages of the first and second sampling means are represented by the traces 59 and 60, respectively. It will be apparent that the waveform and the amplitude of each of these voltages are the same as before, but the frequency is now −20 c.p.s., which means simply that the relative phase position of the phase A voltage 59 has reversed. Now the phase B voltage 60 leads the phase A voltage 59 by a quarter of the low-frequency cycle (i.e., 90 degrees), and the phase sequence is B–A.

The operation of a 3-phase system will be essentially the same as that just described. However, the second train of trigger signals would lag the first signal train by one-third cycle or 120 electrical degrees, and the third train would lag the second train by the same amount. Consequently, there is a 120-degree phase displacement between successive output voltages which will have a phase sequence A–B–C whenever $f$ is higher than F and the reverse phase sequence C–B–A when $f$ is lower than F.

According to my invention, the trigger signal frequency $f$ is programed by a control signal whose magnitude is variable over a given range, with $f$ being equal to the fixed frequency F at a predetermined mid-range control signal magnitude. The control signal is preferably a bipolar D-C voltage that varies between the negative end of the given range (e.g., −30 volts with respect to the zero-potential reference terminal of the D-C power supply) and the positive end of the range (e.g., +30 volts). The aforesaid midrange magnitude is preferably zero. The manner in which $f$ typically varies with such a control signal has been illustrated in FIG. 5, and the variable frequency ($f-F$) of the system output voltages is shown in FIG. 6. A plus output frequency indicates that a certain forward phase sequence of the polyphase output voltages is true, while a minus output frequency indicates that the phase sequence has reversed. At zero frequency ($f=F$), unidirectional output voltages are obtained. Accordingly, a control signal excursion from 0 to +30 volts and back to 0 will cause the output voltages to continuously change in frequency from zero toward maximum and back to zero with a forward phase sequence, while a control signal excursion from 0 to −30 and back will cause the output frequency continuously to increase from zero toward maximum and then return to zero with a reverse phase sequence.

Also according to my invention, the variable amplitude of the system output voltages is programed either independently of or in concert with $f$. The output amplitude depends on the amplitude $v$ of the high-frequency sine wave generated by component 11, and I vary $v$ as a predetermined function of a control signal supplied by the programing means 18. This control signal can vary over a given range of magnitudes, and it may be separate from or the same as the control signal that modulates the variable frequency $f$. As shown in FIG. 1 the choice is made by means of a selector switch 61. Another selector switch 62 illustrates the possibility of modulating $v$ according to either the magnitude of the control signal or its rate-of-change.

With the latter switch set as is shown in FIG. 1, the variable magnitude control signal is fed through a current limit circuit 63 to a rate differentiator 64 whose output current comprises an input quantity for an absolute value circuit 65. Thus the input quantity for the circuit 65 is proportional to the control signal rate-of-change within prescribed limits. The absolute value circuit 65 converts its input quantity to a modulating signal whose magnitude $u$ varies in accordance with the absolute value of the control signal rate-of-change. This modulating signal is applied to the input terminal 13 of the high-frequency sine wave generator 11, and as previously explained, the sine wave amplitude $v$ will be proportional to the modulating signal magnitude. The absolute value circuit 65 is provided with minimum value adjusting means 66 for determining the minimum sine wave amplitude (e.g., zero) when the control signal rate-of-change is zero. Circuit and operational details of preferred embodiments of the components 64, 65 and 66 will soon be described in connection with FIG. 7.

If the selector switch 62 were set in its alternative position, the control signal would be supplied directly to the absolute value circuit 65. Now the magnitude $u$ of the amplitude modulating signal provided by this circuit can be made to vary in accordance with the absolute value of the difference between the control signal magnitude and a predetermined magnitude that is midway between the ends of the given range of control signal variations. Again a predetermined minimum $v$ is obtained when this absolute value is zero.

A better appreciation of this aspect of the invention can be obtained by considering more fully the operation of the absolute value circuit 65. For this purpose a preferred embodiment of the circuit has been shown in FIG. 7 which will now be described. As is there shown, the amplitude control signal can be taken from a variable tap on a potentiometer 67 which is part of the programing means 18. Preferably the potentiometer is connected between relatively positive and negative D-C supply power terminals (see FIG. 3), whereby movement of its tap (by automatic or manual means not shown) causes the control signal magnitude to vary over a range that extends from $-15$ volts to $+15$ volts with respect to the common supply power bus 32 that is connected to the zero-potential reference terminal. When the tap is centered, the control signal has a mid-range magnitude of zero. Alternatively, as indicated in FIG. 7 by a selector switch 68, the control signal can be taken from a terminal 69 adapted to be energized from a remote source of D-C voltage that will vary over a given range (e.g., $\pm 30$ volts) including control signal magnitudes that are both positive and negative with respect to the common bus 32.

As is shown in FIG. 1, the control signal is supplied by the programing means 18 to a bidirectional current limit circuit 63 and thence to a rate differentiator 64 which is simply a series capacitor. The capacitor 64 is connected by way of the selector switch 62 to the absolute value circuit 65, and its charging or discharging current $i$ serves as a bipolar input quantity for this circuit. The magnitude of $i$ is determined by the rate-of-change of the control signal magnitude; the faster the rate-of-change, the higher the input. The current limit circuit 63 is of suitable design to freely pass any $i$ in either direction up to a predetermined maximum magnitude which will not be exceeded if and when the control signal is abruptly changed. The direction of $i$ is called "positive" when flowing into the absolute value circuit 65 due to the control signal magnitude changing and a relatively negative-to-positive direction (e.g., due to raising the tap of the potentiometer 67) and is called "negative" when flowing out of the circuit 65 due to a control signal change in the opposite direction (e.g., due to lowering the potentiometer tap).

In the absolute value circuit 65 the input quantity $i$ passes through a lead 70 which is connected to a pair of NPN transistors 71 and 72 that are interconnected in an inverted common base configuration. Three parallel paths are provided between the input lead 70 and the common bus 32. One comprises the emitter-base junction of the transistor 71 in series with an emitter resistor 73, this junction being poled to conduct when $i$ is positive. The second path is the emitter-base junction of transistor 72 poled to conduct when $i$ is negative. The third path comprises the series combination of a rheostat 74, a fixed resistor 75 whose ohmic resistance is the same as that of the resistor 73, and a diode 76 whose cathode is connected to the common bus 32. The collectors of the transistors 71 and 72 are both connected to a common point 77 which in turn is connected to the positive supply power terminal by means of a circuit including a resistor 78 in series with the input impedance of a current amplifier 80. This circuit conducts direct current $i_o$ the magnitude of which depends on the absolute value of the input current $i$.

The current amplifier 80 comprises a PNP transistor 81 whose collector 81c is connected via a resistor 82 to the common bus 32 and and whose emitter is connected via a resistor 83 to the positive supply power terminal. The base electrode of the transistor 81 is connected to the resistor 78 and also to an input shunt resistor 84 which is connected to the positive supply power terminal by way of a diode 85. While the current amplifying transistor 81 is conducting, a unidirectional voltage proportional to its collector current is developed across the resistor 82. The degree of conductivity of the transistor 81, and hence the potential level of its collector 81c, depends on the magnitude of $i_o$. As is shown in FIG. 7, the collector 81c is connected to the input terminal 13 of the high-frequency sine wave generator 11 previously described, and its potential with respect to the common bus 32 comprises the modulating signal whose magnitude $u$ determines the sine wave amplitude $v$.

In FIG. 7 the minimum value adjusting means for the absolute value circuit 65 comprises a rheostat 66 connected in series with a fixed resistor 86 to form a path from the common point 77 to the negative supply power terminal. Adjustment of the rheostat 66 determines the minimum or quiescent magnitude of $i_o$ when the input current $i$ is zero, thereby establishing a minimum $u$ as desired. If the minimum amplitude equal to zero is desired, then the illustrated path can be open circuited so that $i_o$ will be zero when $i$ is zero. As another alternative, the minimum value adjusting means can comprise a potentiometer like 67, whose tap would be connected to point 77 to there establish a biasing potential that is positive relative to the zero-potential reference terminal, whereby zero $i_o$ and consequently zero minimum amplitude will be maintained until the value of the input current $i$ attains a predetermined threshold level other than zero.

The magnitude of $i_o$ varies as a function of the absolute value of $i$. If the rheostat 74 is set at zero ohms, the interconnected transistors 71 and 72 operate with virtually unity current gain. Regardless of the direction of $i$, an essentially one-to-one magnitude relationship is obtained between $i_o$ and $i$ (assuming that the latter exceeds its threshold level). It is sometimes desirable, however, to effect a higher gain for one direction of $i$ than for the reverse direction. To accomplish this end, the rheostat 74 can be set to add resistance in series with 75, whereby a predetermined gain greater than unit (e.g., four-to-one) will be obtained in response to positive input current. A typical relationship that can consequently be obtained between the magnitude of the modulating signal that energizes terminal 13 and the magnitude of the input quantity in lead 70 has been illustrated in FIG. 8 where line 87 shows how output varies with positive inputs and line 88 shows how output varies with negative inputs. Both of the lines 87 and 88 may be shifted vertically by appropriate adjustment of the minimum valve adjusting means. Where control signal rate-of-change response is used, the rheostat 66 would ordinarily be set to give a finite minimum value other than zero.

The absolute value circuit 65 will operate in exactly the same manner as that just described when the selector switch 62 is moved to its alternative position so that the control signal is supplied to the input lead 70 by way of a circuit including only a resistor 89. Now the magnitude of the input quantity $i$ is determined by the potential difference between the control signal and the common bus 32. Positive $i$ flows when the control signal magnitude is relatively positive, negative $i$ flows when the control signal magnitude is relatively negative, and $i$ is zero when the potential difference is zero.

Assuming that the selector switch 62 is set as shown, it will now be apparent that any change in the control signal magnitude from the relatively positive end toward the relatively negative end of its magnitude range will be accompanied by an increase in amplitude of the low-frequency sinusoidal output voltages of my system, the amount of amplitude increase being dependent on the rate at which the control signal is varied. On the other hand, a control signal change in the opposite direction at the same rate will be accompanied by an even greater increase in output amplitude.

Assuming that control signal magnitude response is desired, the position of the selector switch 62 would be changed. Now a control signal excursion from zero to the relatively positive end of its magnitude range and back to zero will cause the output voltages to progressively change in amplitude from a predetermined minimum (e.g., 0 volts) toward a predetermined maximum (e.g., 48 volts) and back to the minimum, while a control signal excursion from zero to the relatively negative end of its magnitude range and back will cause the output amplitude to increase from the same minimum to a different maximum (e.g., 12 volts) and then to return to minimum. Of course, where desired, both maximums can be made the same by omitting the rheostat 74 in the absolute value circuit 65.

In accordance with another aspect of my invention, means can be provided for locking the high-frequency amplitude-modulated sine wave in synchronism with the frequency-modulated trigger signals whenever an output frequency of zero is intended. As functionally illustrated in FIG. 1, this is accomplished by interconnecting the fixed-frequency square wave oscillator 14 in the sine wave generator 11 and the variable frequency oscillator 19 in the trigger signal producing means 17 through a synchronizing circuit 90 of suitable design. Operation of the synchronizing circuit 90 is supervised by an AND logic element 91 having a "not" input 91a that maintains the synchronizing circuit normally inactive. The "not" input 91a is supplied by an OR logic element 92 whose inputs are respectively derived from the control signal for the frequency-modulated oscillator 19 and from the output current of the rate differentiator 64. The AND element 91 will enable the synchronizing circuit 90 to perform its synchronizing function only while both inputs to the OR element 92 are absent, which condition exists only when there is a steady control signal magnitude of zero (indicating that $f$ should equal F). At this time zero output frequency is desired ($f-F=0$), and the synchronizing means ensures the requisite equality of $f$ and F although either or both of the oscillators may have a tendency to drift.

While I have shown and described a preferred form of my invention by way of illustration, many modifications will occur to those skilled in the art. For example, in lieu of the combination of variable-frequency oscillator 19 and ring frequency divider 20, progressive delay means triggered by the fixed-frequency oscillator 14 could be used for producing the frequency-modulated trigger signals for the sampling means 26. In view of the possibility that the form in which my invention is practiced can vary from the form which has been specifically disclosed herein, it should be understood that I do not wish to be limited to the exact details of construction of the illustrated embodiment.

What I claim as new and desire to secure by Letters Patent of the United States is:

1. A source of variable-frequency polyphase alternating voltages comprising, in combination:
    (a) first means for generating a single-phase cyclic voltage of relatively high fixed frequency F and variable amplitude $v$ said cyclic voltage having a predetermined waveform;
    (b) second means for producing at least first and second trains of intermittent trigger signals, the signals in each train recurring at a variable frequency $f$ and said trains being displaced in phase with respect to each other so that their respective signals are staggered;
    (c) third means for programming both $v$ and $f$;
    (d) polyphase output terminals; and
    (e) fourth means connected to said output terminals for respectively supplying thereto at least first and second out-of-phase alternating voltages, said fourth means including at least first and second sampling means each of which is connected to said cyclic voltage generating means,
        (i) said first sampling means being controlled by said first train of signals produced by said trigger signal producing means for periodically adjusting the value of said first alternating voltage to reflect the instantaneous magnitude and the polarity of said cyclic voltage on the incidence of successive trigger signals in said first train, and
        (ii) said second sampling means being controlled by said second train of signals for periodically adjusting the value of said second alternating voltage to reflect the instantaneous magnitude and the polarity of said cyclic voltage on the incidence of successive trigger signals in said second train, whereby the voltages supplied to said output terminals have approximately said predetermined waveform, a common amplitude dependent on $v$, and a common frequency equal to the difference between F and $f$, with said first alternating voltage leading said second alternating voltage by an electrical angle corresponding to the phase displacement between said first and second trains if $f$ is higher than F and lagging said second voltage by the same angle if $f$ is lower than F.

2. The combination set forth in claim 1 wherein said third means is adapted to be energized by a variable magnitude control signal for varying said cyclic voltage amplitude $v$ as a function of the rate-of-change of the control signal magnitude.

3. The combination set forth in claim 2 wherein said trigger signal frequency $f$ is variable between limits that are respectively lower than and higher than F and said third means is arranged to vary $f$ according to the control signal magnitude.

4. The combination set forth in claim 1 wherein said third means is adapted to be energized by a control signal which is variable over a given range of magnitudes for varying said cyclic voltage amplitude $v$ as a function of the absolute value of the difference between the control signal magnitude and a predetermined mid-range magnitude.

5. The combination set forth in claim 4 wherein said trigger signal frequency $f$ is variable between limits that are respectively lower than and higher than $f$ and said second means is so arranged that $f$ is varied from one of said limits to the other as the control signal magnitude varies from one end of said given range to the other, with $f$ being equal to F whenever the control signal is at said predetermined mid-range magnitude.

6. The combination set forth in claim 1 wherein said second means is arranged to produce first, second, and third trains of intermittent trigger signals which trains are displaced by phase angles of 120 degrees with respect to each other, and said fourth means includes first, second, and third sampling means, said third sampling means being connected to said cyclic voltage generating means and being controlled by said third train of signals for periodically adjusting the value of a third alternating voltage to reflect the instantaneous magnitude and the polarity of said cyclic voltage on the incidence of successive trigger signals in said third train, whereby said third alternating voltage leads said first alternating voltage by an angle of 120 degrees if $f$ is higher than F and lags said first voltage by the same angle if $f$ is lower than F.

7. A variable low-frequency sine wave generator comprising, in combination:
   (a) first means for generating a sinusoidal voltage of relatively fixed high frequency and variable amplitude;
   (b) second means for providing a train of intermittent trigger signals of variable frequency;
   (c) third means adapted to be energized by a variable magnitude D-C control signal for varying the amplitude of said sinusoidal voltage as a function of the control signal magnitude;
   (d) an output terminal; and
   (e) fourth means connected to said output terminal for supplying thereto an alternating output voltage, said fourth means including periodically operative sampling means connected to said first means and controlled by said second means for progressively adjusting the value of said output voltage to reflect the instantaneous magnitude and the polarity of said sinusoidal voltage on the incidence of successive trigger signals, whereby said output voltage approximates a sine wave the frequency of which is equal to the difference between said fixed frequency and said variable frequency and the amplitude of which depends on said sinusoidal voltage amplitude.

8. A variable low-frequency alternating voltage generator comprising, in combination:
   (a) first means for generating a cyclic voltage of relatively fixed high frequency F and variable amplitude $v$, said cyclic voltage having a predetermined waveform;
   (b) second means for providing a train of intermittent trigger signals of variable frequency $f$;
   (c) third means adapted to be energized by a control signal, which is variable over a given range of magnitudes, for varying said amplitude $v$ as a function of the absolute value of the difference between the control signal magnitude and a predetermined mid-range magnitude, with a predetermined minimum amplitude being obtained when said absolute value is zero;
   (d) an output terminal; and
   (e) fourth means connected to said output terminal for supplying thereto an alternating output voltage, said fourth means including periodically operative sampling means connected to said first means and controlled by said second means for progressively adjusting the value of said output voltage to reflect the instantaneous magnitude and the polarity of said cyclic voltage on the incidence of successive trigger signals, whereby said output voltage is characterized by a frequency that is equal to the difference between F and $f$, a waveform that approximates said predetermined waveform, and an amplitude that depends on $v$.

9. The combinations set forth in claim 8 wherein said third means is arranged to effect a first magnitude relationship between $v$ and said absolute value when the control signal is positive with respect to said mid-range magnitude and to effect a different magnitude relationship therebetween when the control signal is negative with respect to said mid-range magnitude.

10. The combination set forth in claim 8 further comprising programming means for varying said trigger signal frequency $f$ between limits that are respectively lower than and higher than $f$ and means interconnecting said first and second means for synchronizing said cyclic voltage with said trigger signals whenever said programing means calls for an $f$ equal to F.

11. The source of variable low-frequency alternating voltage comprising, in combination:
   (a) first means for generating a cyclic voltage of relatively fixed high frequency and of variable amplitude $v$, said cyclic voltage having a predetermined waveform;
   (b) second means for providing a train of intermittent trigger signals of variable frequency;
   (c) third means adapted to be energized by a variable magnitude control signal for varying said amplitude $v$ as a function of the rate-of-change of the control signal magnitude, with a predetermined minimum amplitude being obtained when said rate-of-change is zero;
   (d) an output terminal; and
   (e) fourth means connected to said output terminal for supplying thereto an alternating output voltage, said fourth means including periodically operative sampling means connected to said first means and controlled by said second means for progressively adjusting the value of said output voltage to reflect that of said cyclic voltage on the incidence of successive trigger signals, whereby said output voltage is characterized by a frequency that is equal to the difference between said fixed frequency and said variable frequency, a waveform that approximates said predetermined waveform, and an amplitude that depends on $v$.

12. The combination set forth in claim 11 wherein said third means is arranged to effect a first magnitude relationship between $v$ and said rate-of-change when the control signal magnitude is changing in one direction and to effect a different magnitude relationship therebetween when the control signal magnitude is changing in the opposite direction.

13. The combination set forth in claim 11 wherein programing means is provided for varying said trigger signal frequency over a predetermined range that includes the fixed frequency of said cyclic voltage, and additional means interconnects said first and second means for locking said trigger signals and said cyclic voltage in synchronism whenever said programming means calls for a trigger signal frequency equal to said fixed frequency and said control signal rate-of-change is zero.

14. The combination set forth in claim 11 wherein said third means includes means for limiting said cyclic voltage amplitude $v$ when said control signal rate-of-change is maximum.

15. A variable low-frequency alternating voltage generator comprising, in combination:
   (a) first means for generating a cyclic voltage of relatively fixed high frequency F and variable amplitude $v$, said cyclic voltage having a predetermined waveform;
   (b) second means for providing a train of intermittent trigger signals of variable frequency $f$, where $f$ is variable between limits that are respectively lower than and higher than F;
   (c) third means, adapted to be energized by a control signal whose magnitude is variable over a given range, for varying $v$ and $f$ as functions of the control signal magnitude;
   (d) an output terminal; and
   (e) fourth means connected to said output terminal for supplying thereto an alternating output voltage, said fourth means including periodically operative sampling means connected to said first means and controlled by said second means for progressively adjusting the value of said output voltage to reflect the instantaneous magnitude and the polarity of said cyclic voltage on the incidence of successive trigger signals, whereby said output voltage is characterized by a frequency that is equal to the difference between F and $f$, a waveform that approximates said predetermined waveform, and an amplitude that depends on $v$.

16. The combination set forth in claim 15 wherein said predetermined waveform is sinusoidal.

17. The combination set forth in claim 15 wherein said third means is arranged to vary said cyclic voltage amplitude $v$ as a function of the rate-of-change of the variable control signal magnitude, with a predetermined minimum amplitude being obtained when said rate-of-change is zero.

18. The combination set forth in claim 17 wherein said third means is further arranged to effect a first magnitude relationship between $v$ and said rate-of-change when the control signal magnitude is changing in one direction and to effect a different magnitude relationship therebetween when the control signal magnitude is changing in the opposite direction.

19. The combination set forth in claim 17 wherein said second means is so arranged that said trigger signal frequency $f$ varies from one of said limits to the other as the control signal magnitude varies from one end of said given range to the other, with $f$ being equal to F whenever the control signal is at a predetermined mid-range magnitude.

20. The combination set forth in claim 15 wherein said second means is so arranged that trigger signal frequency $f$ varies from one of said limits to the other as the control signal magnitude varies from one end of said given range to the other, with $f$ being equal to F whenever the control signal is at a predetermined mid-range magnitude, and wherein said third means is arranged to vary said cyclic voltage amplitude $v$ as a function of the absolute value of the difference between the control signal magnitude and said predetermined mid-range magnitude, with a predetermined minimum amplitude being obtained when said absolute value is zero.

21. The combination set forth in claim 15 wherein said first and second means are interconnected by additional means that is operative to lock said trigger signals and said cyclic voltage in synchronism so long as the magnitude of the controlled signal is such that $f$ is intended to equal F.

22. The combination set forth in claim 21 wherein said additional means is arranged to be inoperative whenever the rate-of-change of the control signal magnitude is not zero.

References Cited

UNITED STATES PATENTS

| | | | |
|---|---|---|---|
| 3,081,434 | 3/1963 | Sandberg | 328—150 X |
| 3,209,268 | 9/1965 | Fraunfelder et al. | 328—150 X |
| 3,211,924 | 10/1965 | Beck | 307—225 |

OTHER REFERENCES

Fulford: Generation of Waveforms at Very Low Frequencies Using the Sampling Technique, Proc. I.E.E., vol. III, No. 12, December 1964, pp. 1993–2001.

ALFRED L. BRODY, *Primary Examiner.*

U.S. Cl. X.R.

307—242, 271, 297; 318—30; 325—182; 328—151; 332—42